United States Patent [19]

Press

[11] 4,293,150
[45] Oct. 6, 1981

[54] FLUID CONDUIT ASSEMBLY

[75] Inventor: Irving D. Press, West Orange, N.J.

[73] Assignee: Resistoflex Corporation, Roseland, N.J.

[21] Appl. No.: 760,108

[22] Filed: Jan. 17, 1977

[51] Int. Cl.³ .................... F16L 39/00; F16L 33/20
[52] U.S. Cl. .................................. 285/149; 285/258
[58] Field of Search ............ 285/258, 257, 256, 238, 285/239, 55, 149, 259; 174/47; 138/118

[56] References Cited

U.S. PATENT DOCUMENTS

| 2,268,142 | 12/1941 | Lusher et al. | 285/258 |
| 2,752,637 | 7/1956 | Walker et al. | |
| 2,865,094 | 12/1958 | Press | 285/258 X |
| 2,876,154 | 3/1959 | Usab | 285/238 X |
| 3,030,253 | 4/1962 | St. John et al. | 285/238 X |
| 3,120,966 | 11/1965 | Lyon | |
| 3,166,688 | 1/1965 | Rowand et al. | 174/47 |
| 3,228,096 | 1/1966 | Albro | 285/55 X |
| 3,347,571 | 10/1967 | New | 285/256 X |

FOREIGN PATENT DOCUMENTS 1317618 5/1973 United Kingdom ............... 285/256

Primary Examiner—George H. Krizmanich
Attorney, Agent, or Firm—Hopgood, Calimafde, Kalil, Blaustein & Judlowe

[57] ABSTRACT

A fluid conduit assembly is provided having at least two snug-fitting concentric pipes each of which is independently impervious to fluid. End fittings are secured to each end of the conduit and have separate portions joined, respectively, to a different one of both of the pipes with a separate fluid tight seal therebetween. The outer pipe is metallic while the inner pipe is non-metallic.

9 Claims, 4 Drawing Figures

FLUID CONDUIT ASSEMBLY

The present invention relates to a fluid conduit assembly and, more particularly, to a conduit assembly having increased resistance to failure of a catastrophic nature involving rupture or breach of its wall.

The emphasis today, more than ever, is on safety. In spite of this, not too many years ago, an experimental aircraft was lost because of hydraulic line failures in its first and second primary flight control systems followed by a failure in its third back-up system. In that case the failure was traced to the fracturing of metal tubing used to convey the hydraulic control fluid. Metal tubing was used since it has relatively high strength in relation to its weight and, more importantly for an hydraulic system, resists volumetric expansion and contraction when called upon to handle pulsating fluid pressures. Unfortunately, metal suffers from fatigue, tends to develop cracks when subjected to certain regimes of vibration, and is susceptible to chafing induced failure. Experience has also shown that metal tubing is liable to develop cracks where the tube enters an end fitting. Metallurgical defects have also been known to cause failure.

Non-metallic hose lines have been employed heretofore for conveying hydraulic fluid, but with certain limitations. Because of the incompatibility of hydraulic fluids and many non-metallic materials, only certain materials can be used. However, known non-metallic lines, even with wire reinforcement layers do experience changes in dimension (i.e. volumetric capacity) when used in high pressure systems due to the changes in fluid pressure. Such changes in volume of the lines tend to introduce an undesirable damping factor and phase shift on the control system characteristic. This may appear as an apparent sluggishness in response of the element being controlled relative to the stimuli.

With the foregoing in mind, it is one object of the present invention to provide a fluid conduit capable of the type of service contemplated above which will be more reliable, will satisfy the needs for volumetric constancy, and will not require the incurring of a significant weight penalty.

In accordance with one aspect of the present invention there is provided a fluid conduit assembly having increased resistance to failure of a catastrophic nature involving rupture or breach of its wall. The assembly comprises a fluid-tight metal conduit, a snug fitting liner of non-metallic material disposed within the metal conduit in contact therewith, the liner having its own fluid tight integrity and a response to mechanical vibration which imposes a damping factor on vibration of the metal conduit, and end fittings at opposite ends of the assembly with separate portions of each of the fittings joined, respectively, to the liner and the metal conduit with a fluid tight seal therebetween.

In accordance with another aspect of the present invention there is provided a fluid conduit assembly comprising a fluid conduit with end fittings at opposite ends. The conduit is characterized by at least two snug-fitting concentric pipes each of which is independently impervious to fluid, the outermost being metallic and the innermost being non-metallic. The end fittings each have separate portions joined, respectively, to a different one of both of the pipes with a separate fluid tight seal therebetween.

The term "tube" or "tubing" is used herein in the sense normally accepted by trade usage. It is to be distinguished from the word "pipe" which is generally used to designate tubular products commonly used for pipelines, and connections for conveying fluid from point to point. Tubular products used in the machine and aircraft industries are generally referred to as "tubes" or "tubing". Tubing is generally thinner walled, lighter, and less rigid than pipe. However, "pipe", unless it appears otherwise from the context, is used herein as a generic term encompassing all fluid conduits including tubing.

Conduits have been made, heretofore, with multiple concentric tubular layers. However, as far as can be ascertained they can all be distinguished from the present invention.

Thus, for example, steel pipe fitted with end flanges has been lined with various synthetic resins such as polytetrafluoroethylene with the liner extending throughout the entire length of the pipe and having its ends flared over the pipe flange faces. Generally, vent holes have been incorporated in the wall of the steel pipe to release gases that might permeate the wall of the plastic. Before making a joint between adjacent pipe ends, the liner is free and unsealed. When a joint is made the flared ends of adjacent liners are compressed between facing flanges. No separate sealed connection is established between the metal flanges and if the seal between the plastic liners should fail the entire joint will fail.

In an early U.S. Pat. No. 768,188 issued Aug. 23, 1904, there is described a hose assembly wherein two heavy fabric tubes of woven yarn are disposed concentrically with the inner tube coated on its inner surface with a layer of rubber. While the two tubes are not bonded together, the ends are squeezed together in a compression type hose and fitting. Here the purpose of using a multi-wall tube is to provide for increased flexibility. Only the inner tube is impervious to fluid and then only if the rubber lining is intact. Furthermore, the nature of the fitting grip on the end of the hose was such that the connections established between the fitting and each tube were mutually dependent with both being gripped by the same portion of the fitting and subject to failure at the same time.

In U.S. Pat. No. 2,800,145, issued July 23, 1957, on an application by the present application jointly with another there is described a barrier hose assembly wherein a generally integral hose structure was employed. That hose had preferably a Neoprene inner lining tube which was pervious to the Freon refrigerant it was intended to handle although chemically inert relative thereto. To seal the tube it was surrounded by a barrier layer of plasticized polyvinyl alcohol. The plasticizer for the polyvinyl alcohol contained water, a substance which cannot be tolerated in the refrigerant. However, the Neoprene was impervious to water. Finally, the outer surface of the polyvinyl alcohol layer was protected and the plasticizer confined by a Neoprene covering layer. Collectively, the composite hose was capable of containing Freon refrigerant without leakage, although neither the polyvinyl alcohol nor Neoprene layer could perform the function independently.

The last mentioned patent also described a compression end fitting in which a stepped nipple is inserted in the composite hose end with a cork filled rubber sealing ring in such manner as to develop a seal for preventing the escape from within the barrier layer of the hose of any refrigerant permeating the inner tube. Since the inner tube of the hose was cut back to correspond with the step on the nipple such fitting established seals between different portions of itself and the several layers of the hose wall.

While in retrospect it might appear that certain similarities exist between the heretofore known constructions and that to be described, no prior assembly is known which is either constructed or functions in the sense herein contemplated. Consider, for example, the outer metal pipe. It constitutes with the end fittings a complete fluid conduit whether rigid pipe or metal tubing is used. Ignoring outside mechanical forces and influences such as vibration, bending, chafing and the like, the pressure and temperature rating of the outer pipe as well as its chemical resistance or inertness will be sufficient by itself to handle the fluid for which the entire assembly is intended. Yet, the entire assembly contains essentially a second complete pipe conduit disposed within the first except that the end fittings are shared in common, although different portions establish the sealing connection to the two pipes, and the second complete pipe conduit has a non-metallic pipe. When the latter is installed within the metal pipe it will have the same pressure capability. The chemical inertness of the non-metallic pipe can be as good or better than the metal pipe. However, a number of unobvious advantages are obtained.

Unexpectedly, the non-metallic pipe appears to damp vibration of the metal pipe to such an extent that at least when the metal pipe is in the form of tubing, substantial increase in flex life is obtained before fracture or fatigue failure of the metal tube. Even when the outer pipe is heavy walled and essentially rigid, an improvement results. Because of the significant bridging strength of various non-metallic materials contemplated herein, a small crack in the outer pipe, while visually detectable, will not give rise to failure since the inner pipe will bridge the gap and not "blow" through. It is most unlikely that a breach in both pipes will occur in the same location. But, what if the inner pipe develops a leak? Since the inner pipe, as described hereinafter, has some yieldability under internal fluid pressure, the margins of any breach in the wall will be pressed radially outwardly forming a lip seal against the inner surface of the outer pipe. Because of the restraint imposed by the outer pipe, gross failure of the inner pipe is not believed possible.

The invention will be better understood after reading the following detailed description of the presently preferred embodiments thereof with reference to the appended drawings in which.

Throughout the several figures of the drawings the same reference numerals are used to designate the same or similar parts.

Figure 1:
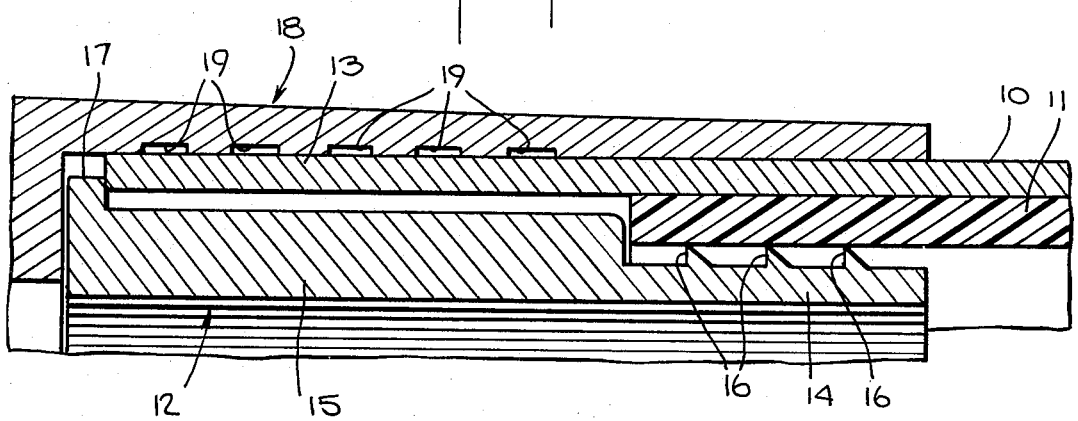
FIG. 1 is a fragmentary sectional view showing a fitting interfitting with the end of a pipe having a metallic outer pipe in the form of tubing surrounding a non-metallic inner pipe also in the form of tubing prior to expansion of the fitting nipple.
Figure 2:
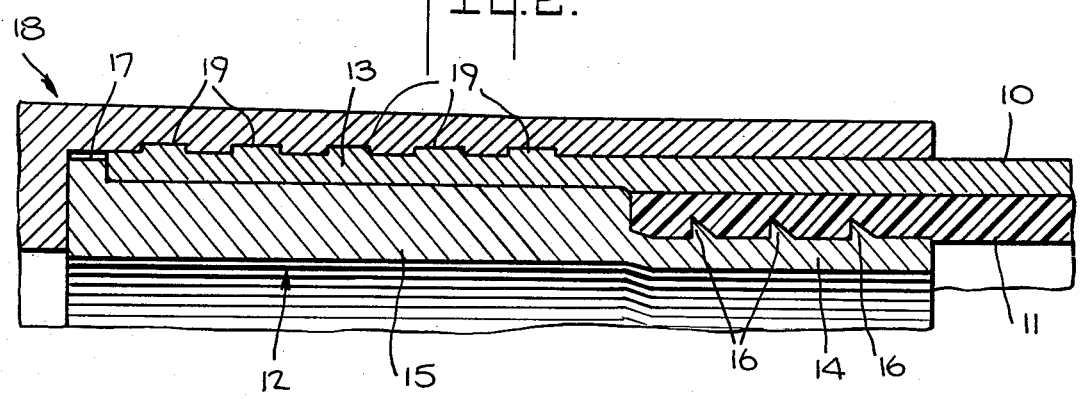
FIG. 2 shows the assembly of FIG. 1 after completion of the nipple expansion.

Referring now to FIGS. 1 and 2, there is shown only sufficient detail to illustrate the assembly. The assembly includes a fluid tight conduit wherein the radially outermost pipe 10 is a metallic tube extending axially beyond both ends (only one end of which is shown in the drawing) of the radially innermost pipe 11 which is a non-metallic tube. Strictly by way of example, a conduit having a nominal 1" O.D. may have a pipe 10 of stainless steel tubing with a wall thickness of 0.052" while the inner pipe 11 may be a tube of sintered paste extruded polytetrafluoroethylene having a wall thickness of the order of 0.035". As a further example, the pipe 10 may have a nominal 5/16" O.D. and a wall thickness of 0.028" while the pipe 11 has a wall thickness of 0.031", both materials being the same as in the preceding example. The wall thickness of both pipes may be varied over wide ranges as desired. Although stainless steel and polytetrafluoroethylene have been mentioned above, other metals and non-metallic materials may be used to advantage as will be apparent to those skilled in the art. It should be understood that the PTFE tube will have a yielding or pliable wall somewhat similar to an elastomer although essentially inelastic.

Figure 4:
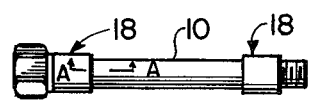
FIG. 4 is an assembly view to a reduced scale showing typical fittings on opposite ends of the pipe, the details of which have been illustrated in FIGS. 1 to 3 above.

Each end of the conduit is provided with an end fitting, as shown in FIG. 4, one end only of the conduit being shown in FIGS. 1 and 2, which are sectional views taken typically along line A—A in FIG. 4. The fitting at the other end may be identical. As shown, the end fitting comprises a nipple 12 extending into the corresponding end of the conduit past the extending portion 13 of the metallic pipe 10 for a short distance into the non-metallic pipe 11. The portion 14 of the nipple 12 extending within the non-metallic pipe 11 has a generally lesser diameter than the diameter of the portion 15 within the extending portion 13 of the metallic pipe 10. As shown in FIGS. 1 and 2, the reduced diameter portion 14 is provided with a plurality, here shown as three, of annular ribs or barbs 16 which, when the fitting is fully assembled, become embedded in the inner surface of the pipe 11.

The nipple 12 is also provided with a radial flange 17 at one end for locating the end of the metal pipe 10. A socket 18 of the end fitting overlies the metallic pipe 10 at its end securing the corresponding ends of the metallic and non-metallic pipes against the underlying nipple 12 when the fitting is fully assembled as shown in FIG. 2.

Prior to full assembly of the fitting, the conduit mates with the several parts of the fitting as shown in FIG. 1. The inner surface of the socket 18 is provided, as shown, with a plurality of axially spaced annular grooves 19.

To complete the assembly, the socket is placed within a holding die (not shown) and the nipple 12 is extended by a suitable expanding tool both to cause the ribs 16 to become embedded in the inner surface of the non-metallic pipe 11 and to displace the metal of the pipe 10 into the grooves 19 of the socket 18, the latter, i.e., the projection of pipe metal into the grooves 19, serving both to mechanically interlock the socket 18 with the metallic pipe 10 and to establish a fluid-tight seal therebetween. It will be understood that the ribs 16 upon becoming embedded in the surface of the pipe 11 will also serve to establish both a mechanical interlock between the nipple 12 and the non-metallic pipe 11 and a fluid-tight seal therebetween. It should be noted from FIG. 2 that the portion 15 of the nipple is expanded to a greater extent than the portion 14. This is to ensure establishing a complete fluid-tight seal and mechanical interlock between the metal pipe 10 and the socket 18.

A suitable tool for expanding the nipple 12 within the socket 18 is described in my U.S. Pat. No. 3,641,798, issued Feb. 15, 1972 for "EXPANDING TOOL" and assigned to the same assignee as the present application.

It should be apparent from an examination of FIG. 2 that so long as a fluid-tight seal is maintained between the end fitting and one of the pipes 10 or 11, the assembly will maintain its fluid-tight integrity. Furthermore, it has been found experimentally that a small crack or fracture can be tolerated in the metal pipe 10 without causing failure of the inner non-metallic pipe 11. The plastic of the pipe 11 has substantial bridging strength over short gaps such that it can withstand substantial internal fluid pressure before blowing out through such gap. Thus, arbitrarily assuming that the pipe 10 if used alone would be rated as capable of handling fluid having a maximum pressure of, say, 3,000 PSI, the same fluid pressure would be contained by the conduit assembly even if the pipe 10 should develop a small crack or fracture due to metal fatigue or other cause. This would be true even though the non-metallic pipe 11, if used alone, would be unable to withstand pressure of that magnitude.

As mentioned above, the combined metal and non-metallic pipe assembly has a greater flex life than the metal pipe alone. This was established by using an accepted flexure test procedure employed in the aircraft industry. A 5/16" O.D. tube with a wall thickness of 0.020", of Type 304 stainless steel, ⅛th hard was used as an outer pipe 10. It was lined with a 0.037" thick tube of sintered paste extruded PTFE as the inner pipe 11. The PTFE tube was produced by the process described in U.S. Pat. No. 2,752,637, issued July 3, 1956, for "Extrusion of Polytetrafluoroethylene". The double wall pipe was assembled with end fittings of the type described with reference to FIGS. 1 and 2 to produce a number of test specimens. Reference specimens were also prepared using only the metal tubing. Then the specimens were subjected to the flexure test under varying conditions with the results set forth in table I.

TABLE I

| Pipe construction | Bending stress level in PSI | Internal fluid pressure PSI | Cycles to failure |
| --- | --- | --- | --- |
| metal only | 60,000 | 0 | $.28 \times 10^6$ |
| metal/PTFE | 60,000 | 0 | $1.44 \times 10^6$ |
| metal only | 40,000 | 1,500 | $.76 \times 10^6$ |
| metal/PTFE | 40,000 | 1,500 | $>5 \times 10^{6*}$ |

*The last test in Table I was stopped without failure at $5 \times 10^6$ cycles.

It should be observed that a metal tube was selected for the outer pipe which would have inherently a good flex life when used unlined. It may be expected that more dramatic results would have been achieved if the metal tubing was of a type and dimensioned to have a shorter flex life when used alone.

Figure 3:
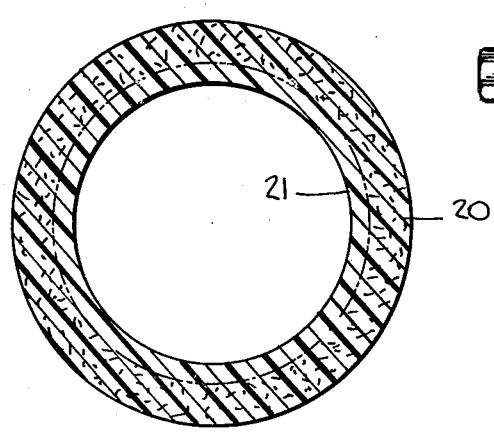
FIG. 3 is a cross sectional view of an inner pipe in the form of a tube with a composite wall.

Instead of using the process of U.S. Pat. No. 2,752,637 to produce a tube with a uniform homogeneous wall throughout, still greater improvement can be obtained by using as the inner pipe 11 a tube having an integrated composite wall of sintered PTFE resin with a radially outer zone 20, see FIG. 3, extending around the entire circumference of the tube wall and containing a quantity of fibrous material dispersed throughout. The remainder of the composite wall throughout the zone 21 in FIG. 3 is free from the fibrous material which should have a temperature capability at least equivalent to the PTFE resin. The fibrous filled zone 20 reduces the thermal expansion differential between the composite pipe and the metal pipe which it lines and also increases the stiffness of the non-metallic pipe and its bridging strength. This also increases the pipe's resistance to collapse under vacuum pressure at elevated temperature and also increases the ability of the metal pipe to be bent without significant departure from roundness at the bend.

The composite wall tubing of PTFE resin can be produced by concentric extrusion as described in the article entitled "Paste Extrusion of Filled TFE-Fluorocarbon Resin For Wire Insulations" appearing at pages 151 to 154 of SPE JOURNAL for February 1961. The fiber filler may be asbestos, mica, quartz or the like. Preferably the inner zone 21 has dispersed carbon black particles as described in said U.S. Pat. No. 2,752,637. Where the conduit is intended to handle fluids such as aircraft fuel which causes an electrostatic charge to develop on the non-metallic pipe, at least the radially innermost circumferential portion of the zone 21 of FIG. 3, may have a high loading of carbon black particles to prevent build up of a charge sufficient to damage the pipe wall. In the latter case, the remainder of zone 21 may have only a moderate loading of carbon black just sufficient to render it semi-conductive, or said remainder may be filled with the fibrous material, or the heavy loading of carbon black may extend through zone 21. While the content of the various zones differ, the PTFE matrix is essentially unified with no apparent discontinuities at the junctions between adjacent zones.

Having described the presently preferred embodiments of the invention it will be understood that various changes in construction may be made without departing from the true spirit of the invention as defined in the appended claims.

What is claimed is:

1. A fluid conduit assembly comprising a fluid conduit with end fittings at opposite ends, characterized in that said conduit includes at least two snug-fitting concentric pipes each of which is independently impervious to fluid, the outermost being solid metallic and the innermost being non-metallic, and said end fittings each have separate portions joined, respectively, to a different one of both of said pipes with a separate fluid tight seal therebetween.

2. A fluid conduit assembly according to claim 1, characterized in that said pipes are non-coextensive, with the end of one pipe projecting axially beyond the end of the other pipe at each end of the conduit, and said end fittings each comprise a first portion gripping in fluid-tight fashion that end of the pipe which projects, and a second portion gripping in fluid-tight fashion the non-projecting end.

3. A fluid conduit assembly according to claim 1, characterized in that said outermost pipe is a metallic tube extending axially beyond both ends of said innermost pipe which is a non-metallic tube; and said end fittings each comprise a nipple portion extending into the corresponding end of said conduit past the extending portion of said metallic tube for a short distance into said non-metallic tube, the part of said nipple portion within said non-metallic tube having a lesser diameter than the diameter of the part within the extending portion of the metallic tube, and a socket portion overlying said metallic tube end securing the corresponding ends of said metallic and non-metallic tubes against the underlying nipple portion.

4. A fluid conduit assembly according to claim 3, characterized in that said socket portion is provided with a plurality of axially spaced annular grooves on its radially inner surface, and the projecting end of said metallic tube has material extending into said grooves for both mechanically interlocking said socket portion with said metallic tube and for establishing a fluid-tight seal therebetween.

5. A fluid conduit assembly according to claim 4, characterized in that the radially outer surface of said nipple portion where it extends into said non-metallic tube end is provided with a plurality of axially spaced annular ribs embedded in the radially inner surface of said non-metallic tube for establishing both a mechanical interlock between said nipple portion and said non-metallic tube and a fluid-tight seal therebetween.

6. A fluid conduit assembly according to claim 1, characterized in that said innermost pipe has an integrated composite wall of sintered PTFE resin with a radially outer zone extending around the entire circumference of said wall containing a quantity of fibrous material having a temperature capability at least equivalent to said PTFE resin and dispersed throughout said zone thereby reducing the thermal expansion differential between said two pipes, the remainder of said composite wall being free from said fibrous material.

7. A fluid conduit assembly according to claim 6, characterized in that said remainder of said composite wall contains a quantity of carbon black particles dispersed throughout and imparting electrical conductivity thereto sufficient to prevent wall damaging build-up of electrostatic charge.

8. A fluid conduit assembly according to claim 1, characterized in that said innermost pipe has a wall of sintered PTFE resin.

9. A fluid conduit assembly having increased resistance to failure of a catastrophic nature involving rupture or breach of its wall, said assembly comprising a fluid tight solid metal conduit, a snug fitting liner of non-metallic material disposed within said metal conduit in contact therewith, said liner having its own fluid tight integrity and a response to mechanical vibration which imposes a damping factor on vibration of said metal conduit, and end fittings at opposite ends of said assembly with separate portions of each of said fittings joined, respectively, to said liner and said metal conduit with a fluid tight seal therebetween.

* * * * *